C. F. PYM.
LASTING MACHINE.
APPLICATION FILED JAN. 30, 1908.

1,010,394.

Patented Nov. 28, 1911.

5 SHEETS—SHEET 2.

Witnesses
J. G. Hinkel
J. J. McCarthy

Inventor
Charles F. Pym
by Geo. H. Maxwell,
Attorneys

C. F. PYM.
LASTING MACHINE.
APPLICATION FILED JAN. 30, 1908.
1,010,394.
Patented Nov. 28, 1911.
5 SHEETS—SHEET 3.
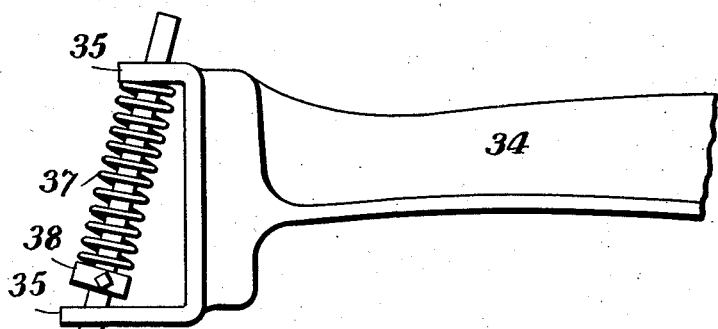
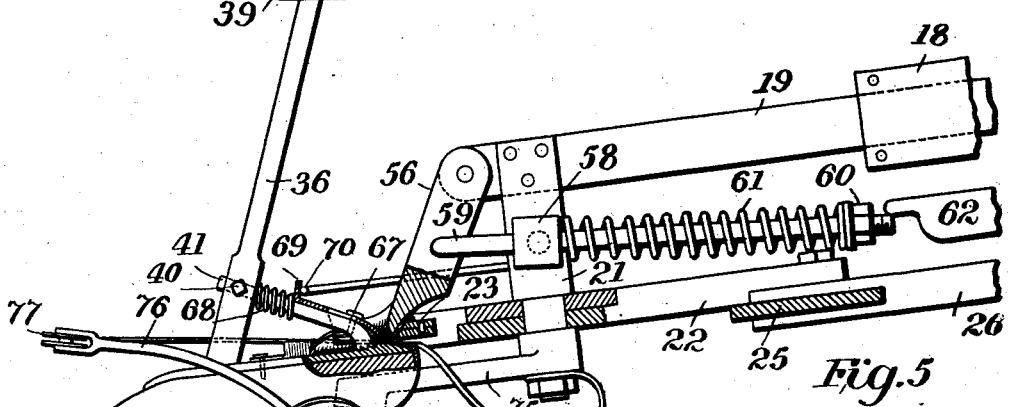
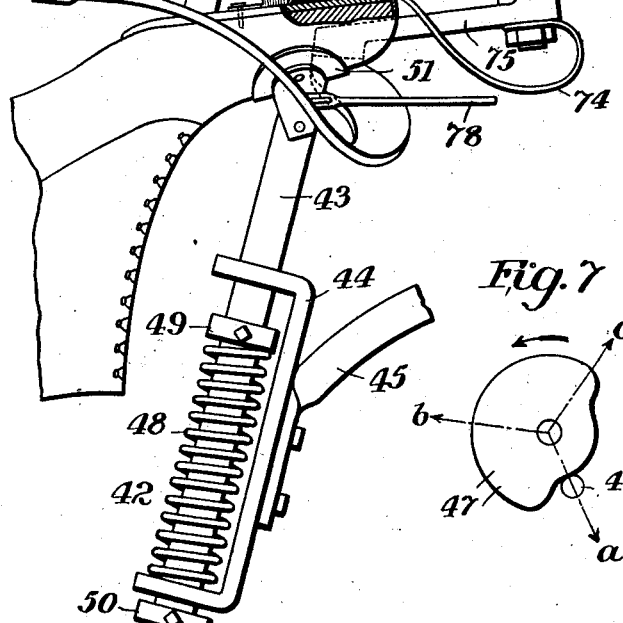
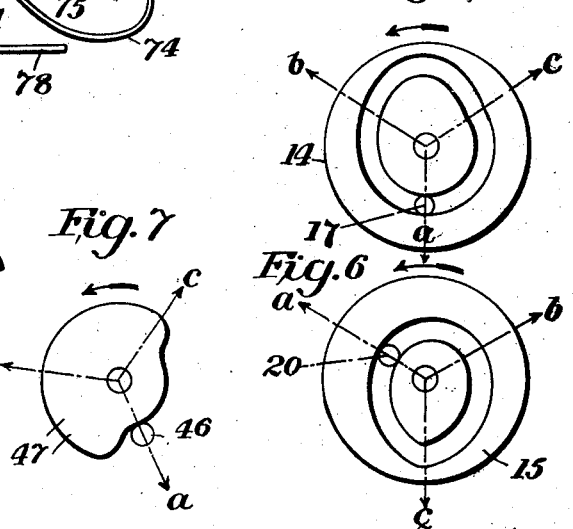
Inventor
Charles F. Pym.
by Geo. W. Maxwell,
Attorneys
Witnesses
J. Stinkel
J. J. McCarthy C. F. PYM.
LASTING MACHINE.
APPLICATION FILED JAN. 30, 1908.
1,010,394.
Patented Nov. 28, 1911.
5 SHEETS—SHEET 4.
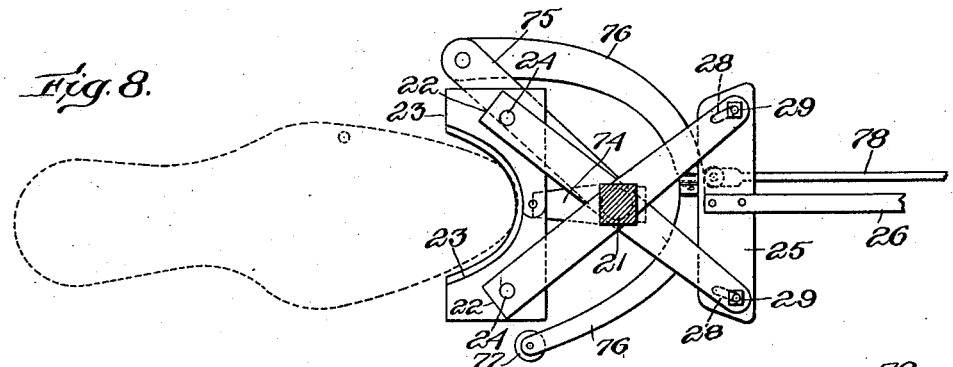
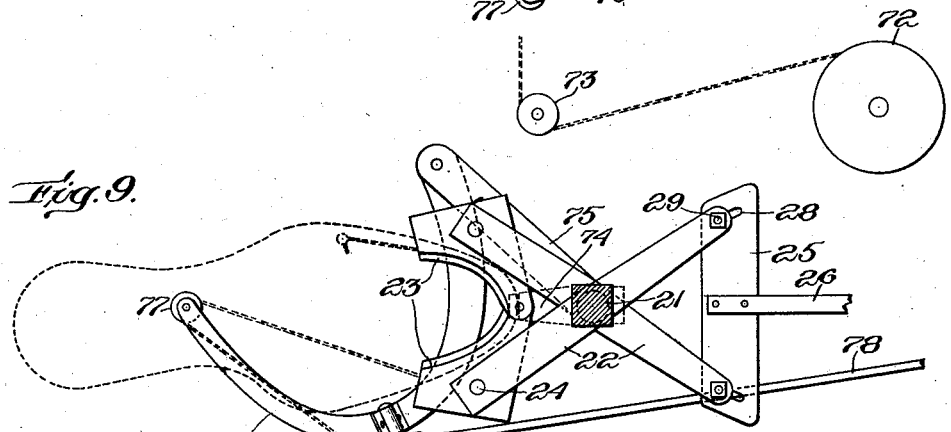
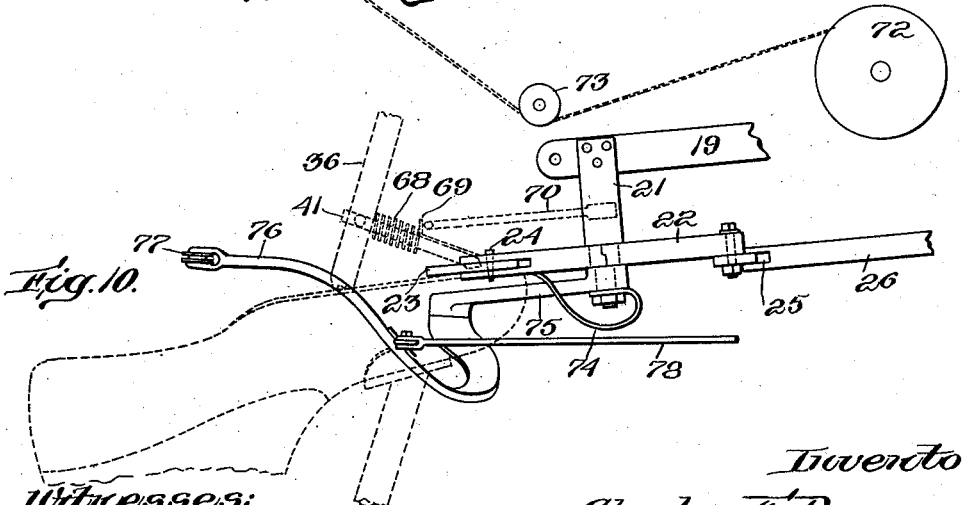

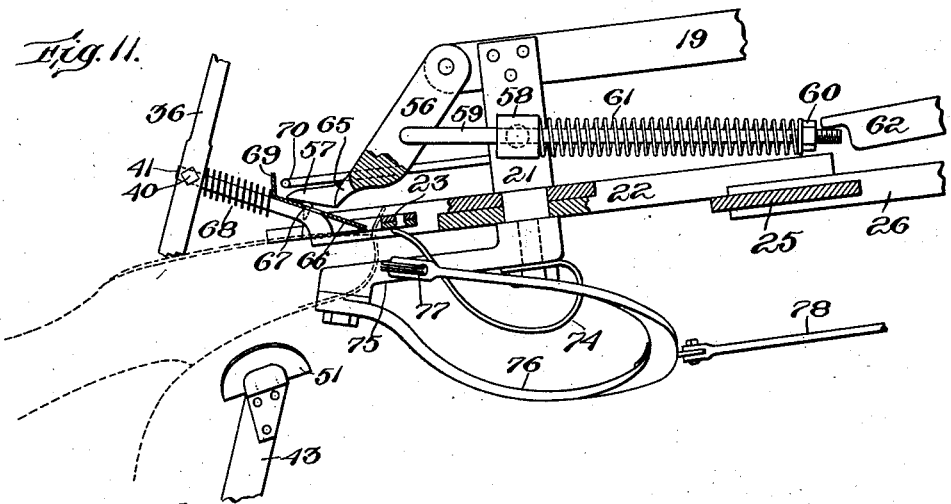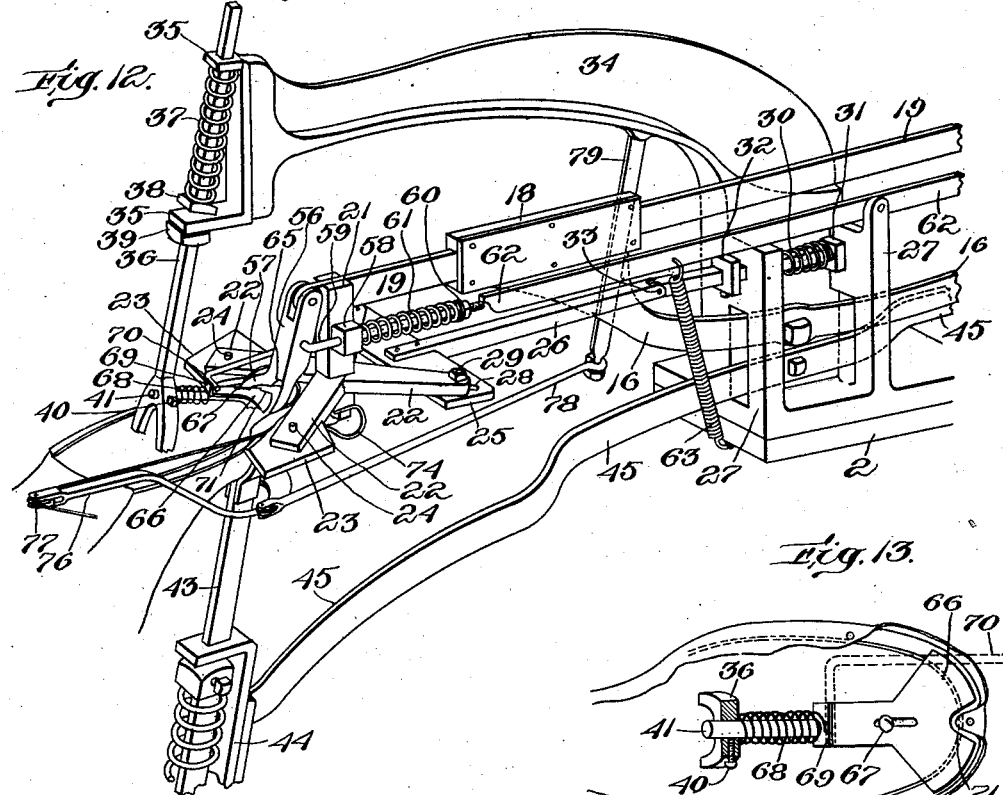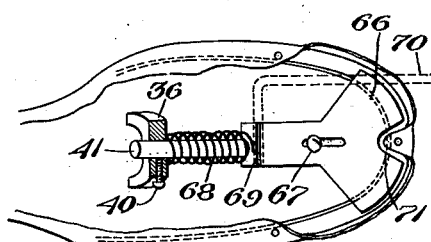

UNITED STATES PATENT OFFICE.

CHARLES F. PYM, OF ESSEX, ONTARIO, CANADA, ASSIGNOR OF ONE-HALF TO KRENTLER BROTHERS COMPANY, OF DETROIT, MICHIGAN, A CORPORATION OF MICHIGAN.

LASTING-MACHINE.

1,010,394.  Specification of Letters Patent.  Patented Nov. 28, 1911.

Original application filed March 28, 1907, Serial No. 364,960. Divided and this application filed January 30, 1908. Serial No. 413,430.

*To all whom it may concern:*

Be it known that I, CHARLES F. PYM, a subject of the King of Great Britain, residing at Essex, in the Province of Ontario, Canada, have invented an Improvement in Lasting-Machines, of which the following description, in connection with the accompanying drawings, is a specification, like letters on the drawings representing like parts.

This invention relates to lasting machines, the present application being a division of the original application, Ser. No. 364,960 filed Mar. 28, 1907 (now Patent No. 882,018, patented March 17, 1908).

One of the main objects of the invention covered by this divisional case is to provide, in connection with the lasting mechanism, means for automatically drawing around the toe of the last a wire or other binder for holding the upper in place after being lasted, said means preferably consisting of a pivoted arm for carrying and stretching a wire around the toe of the last for holding the edge of the upper in place after the lasting operation is completed, and means for guiding said wire into place as it is drawn about the toe by said arm, which is automatically operated in timed relation to the movement of the lasting wipers.

The invention herein set forth also relates to further details of construction, arrangement and combination of parts whereby the wiring and subordinate operations are accomplished in a satisfactory and expeditious manner.

To fully disclose my invention I have shown not only the particular parts herein claimed, but sufficient details of the complete machine to enable fully the operation and construction thereof readily to be understood.

Figure 1:
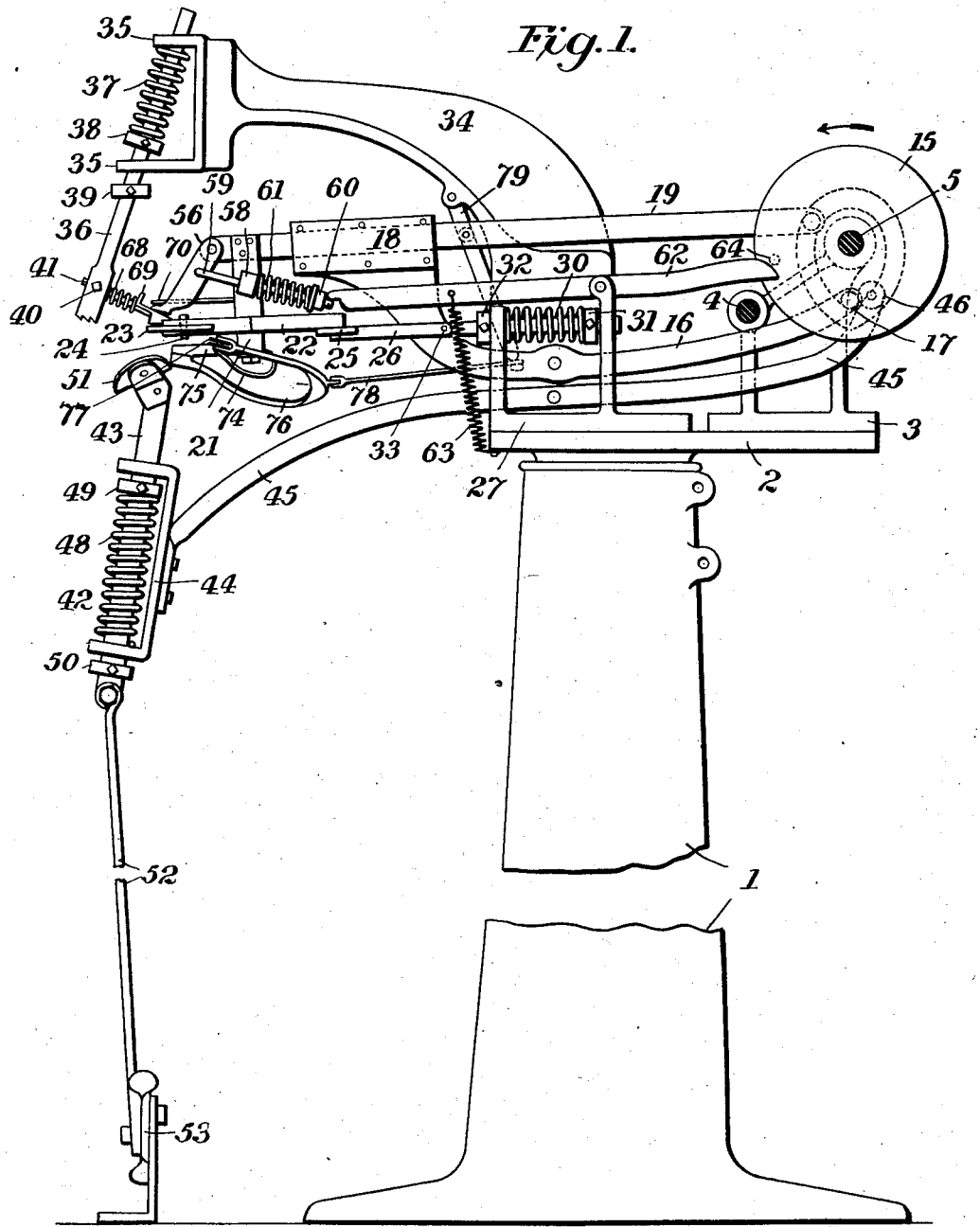
Figure 2:
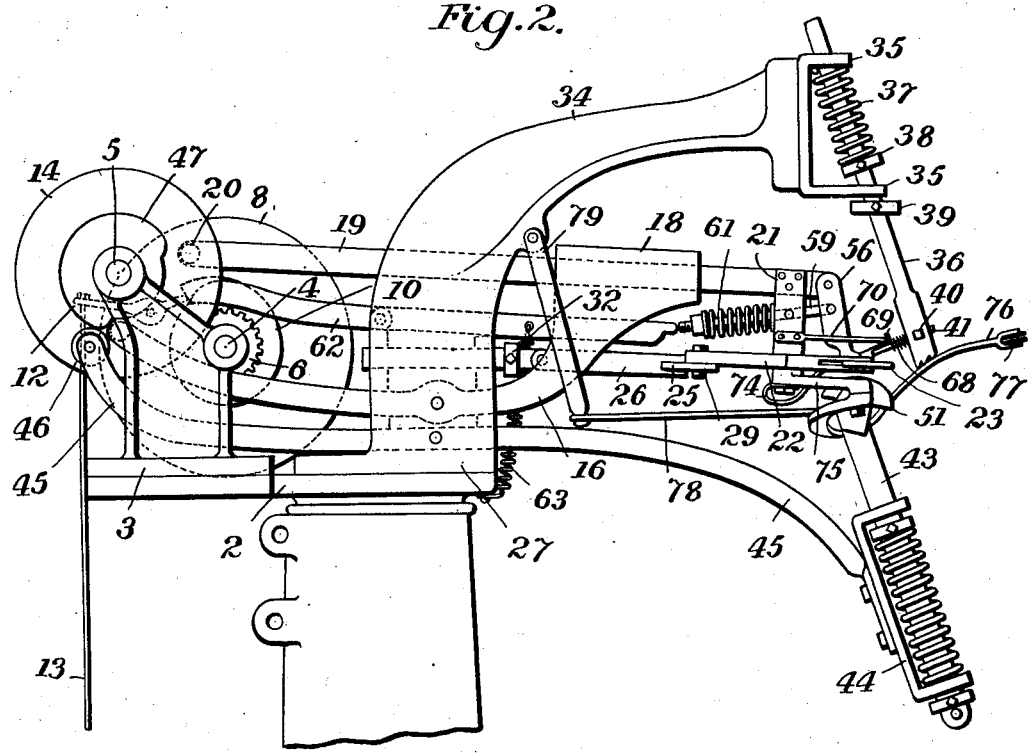
Figure 3:
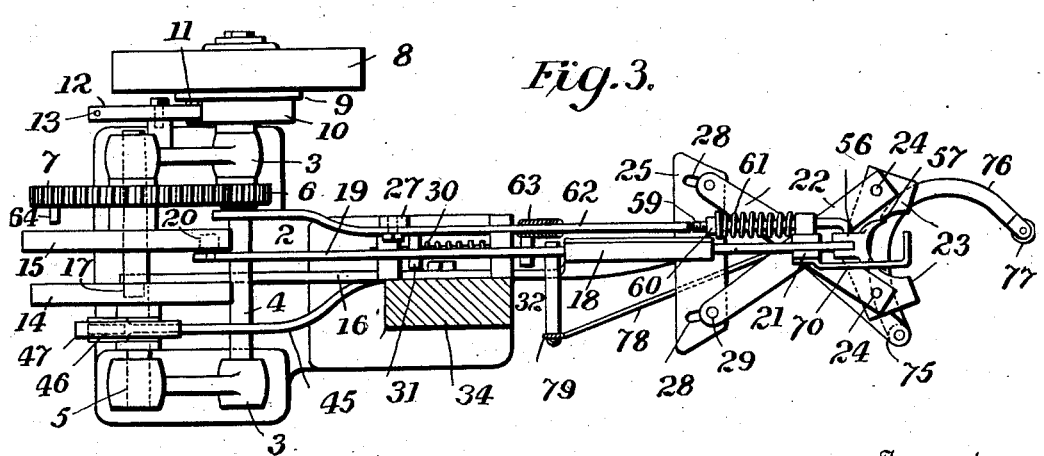

Figure 1 showing the machine in side elevation, partly in section; Fig. 2 a similar side elevation of the reverse side of the machine; Fig. 3 a plan view partly in section; Fig. 4 an enlarged detail of the last holding and lasting devices with parts broken away to show the construction; Figs. 5, 6 and 7 showing in elevation the cams respectively for operating the rocker bar, push bar, and jack; Figs. 8 and 9 details in plan showing respectively the lasting and toe wiring mechanism in position before and after the lasting operation; Fig. 10 a side elevation of Fig. 9; Fig. 11 a view similar to Fig. 4 showing the parts in position to receive the shoe; Fig. 12 a perspective detail of the parts in position just as the wiring operation is about completed; and Fig. 13 is a plan view of a last showing an insole and upper secured thereon and the top plate and binding wire in operative position.

Although my invention relates more particularly to the wiring or binding means for securing the edge of the upper in place after the lasting operation, it is necessary for a proper understanding of the wiring mechanism and the coöperating parts, to describe more or less of the machine and its general operations.

As shown in the drawings 1 is a suitable supporting pedestal upon the upper end of which is secured a bed or table 2 having suitable bearing brackets 3 each having two bearings, one for a driving shaft 4 and the other for a driven or counter shaft 5, motion being transmitted from the driving to the driven shaft by gears 6 and 7 which are in the proportion of three to one so that one revolution of the driving shaft will turn the counter shaft but one-third of a revolution.

8 is a suitable belt pulley mounted loosely on the driving shaft and having a suitable roller clutch mechanism of any well known construction located in its hub casing 9 to connect the pulley to the shaft. A suitable wheel 10 secured on the driving shaft is formed with a notch or shoulder 11 adapted to be engaged by a dog 12 pivoted upon the bearing bracket and operated by a rod 13 attached to a suitable foot pedal (not shown) to throw the dog out of engagement with the notch and permit the clutch to turn the shaft. The driving shaft is thus stopped by the dog at the end of each revolution and the driven or counter shaft is stopped at three certain positions during each revolution, the operator controlling the starting of the machine each time by the actuation of the dog.

Secured upon the counter shaft 5 are two wheels formed with cam grooves which wheels I will call for convenience of description the rocker-cam 14 and the push cam 15.

16 is a rocker-bar pivoted intermediate its ends and carrying on its tail end a roll 17 engaging the cam groove of the rocker-cam, and at its forward end provided with an extended supporting guide way 18 for a push bar 19 which is adapted to slide longitudinally in said way and is carried and rocked vertically by said rocker bar. This push-bar is also provided with a roll 20 which engages the cam groove in the push-cam 15 and rigidly secured to it near its forward end is a depending post 21 to the lower end of which are pivotally attached the crossed levers 22 at their point of intersection. To the forward ends of these levers 22 are pivotally attached the wipers 23 which consist of two hinge connected plates formed at their adjacent edges to conform approximately to the outline of either the heel or the toe of the shoe and these wipers turn freely within slots cut in the ends of said levers upon pivot pins 24 extending through said levers and wipers and are thus held so that they may be quickly and easily removed and other wiper plates having a different form inserted to more nearly conform to the particular shape of toe or heel to be lasted. In this machine it is not, however, necessary as will be hereinafter more fully set forth, to change these wipers in lasting the different sizes of substantially the same form but only when there is a radical change in the form, as from a round to a very pointed toe or from toe lasting to heel lasting or from ladies' to gents' shoes, etc.

The rear ends of the crossed levers are connected by a plate 25 secured to the forward end of a bar 26, which extends rearwardly through bearings 27 secured upon the table 2. The said plate is provided near its ends with forwardly converging slots 28 through which the pins or bolts 29 connecting the levers to said plate pass and slide freely, and sleeved upon the bar 26 between the bearings is a coiled spring 30 engaging the forward bearing at one end and a collar 31 on that bar at its opposite end to normally resist the forward longitudinal movement of said bar in its bearings, a second collar 32 on said bar forward of its first bearing serving to limit the rearward movement of said bar in its bearings. A joint 33 in said bar is provided to permit the up and down movement of the wipers, which movement is caused by the rocker-bar.

When the push cam 15 moves the push-bar forward, the pivotal point of the crossed-levers is moved forward by the post 21 and this movement by reason of the forwardly converging slots in the plate 25 causes the ends of the levers to move toward each other and close the wipers inward, the spring 30 on the bar 26 holding said plate against any forward movement unless the resistance to the closing of the wipers, caused by their contact with the shoe, is sufficient to overcome the resistance of said spring, when the spring will yield and permit a slight forward movement of said plate, which movement by lessening the movement of the pins 29 in their slots, will lessen the distance which the wipers will be closed by a given forward movement imparted to the push-bar by its cam. The wiping force of the wipers is thus regulated by the tension of said spring which may be adjusted by the collar 31 and will be the same regardless of variations in the toes or heels of the shoes operated upon.

Secured upon the table 2 is an upwardly and forwardly extending bracket-arm 34 the forward end of which is provided with guide lugs 35 through square openings in which a presser-bar 36 slides. For convenience in operating the machine this bar is set in a downwardly and forwardly inclined position and is normally held against movement in its bearings by a coiled spring 37 sleeved thereon between said guide lugs and engaging the upper lug at one end and a collar 38 adjustably secured upon the bar at its opposite end. A second collar 39 on said bar below the lower guide lug is provided to limit the upward movement of said bar. The lower end of said presser bar is roughened or formed with teeth to engage the sole over which the upper is to be lasted, at some distance from the toe or heel of the last, and adjustably secured in a transverse hole in said bar by a set screw 40, is a presser arm 41 extending rearwardly of the machine and formed with a downwardly curved and toothed end to engage the shoe sole at a point near the end of its toe or heel. The adjustment by means of the set screw 40 varies the angle or plane of engagement of the presser bar and presser arm. To hold the last upon which the shoe is secured in position for lasting, up against these two points of contact, namely the ends of the presser bar and presser arm, an automatically operated jack 42 is provided consisting of a bar 43 guided in openings in bearing ears on a bracket 44 secured to the end of a supporting and operating bar 45 which is pivoted intermediate its ends to a convenient stationary part of the supporting frame of the machine and is provided at its extreme rear end with a roll 46 to engage the cam surface of an outside cam 47 secured upon the countershaft 5.

Between the bearing ears of the bracket 44 a coiled spring 48 is sleeved upon the bar 44 and engages the lower end at one end and a collar 49 adjustably secured upon the bar, at its opposite end, to yieldingly support the bar in its bracket, and a second collar 50 is secured upon the bar below the lower ear to limit the upward sliding movement of the bar in its bearings. On the upper end of the bar is a curved seat 51 for the last, shaped to conform to the surface thereof just forward of the instep and support the said last at a point intermediate the points at which the presser bar and arm engage the sole and thus firmly clamp the last between said bar and arm above, and the jack below, said jack being raised to so clamp the last, in timed relation to the movement of the wipers and other parts, by the jack-cam 47. The toe of the last is thus firmly clamped and held between three points of contact in position for lasting and when placed in the machine by the operator it may be adjusted laterally thereon to bring the toes of lasts having various lines of swing in the proper relation to the wipers, and by providing the springs 37 and 48 to yieldingly hold the presser bar and jack, respectively, the last is clamped between members which will yield vertically to accommodate lasts of various thicknesses and to permit the wipers to swing downward a fixed distance regardless of the thickness of the last. The spring 37 is made lighter than the spring 48 so that when the last is clamped between the jack and presser-bar with the wipers out of contact with the last, the spring 48 will overcome the spring 37, moving the presser bar upward until the collar 39 engages the lug 35 which collar is adapted to be adjusted so as to stop the last in its upward movement in the proper relation to the wipers to permit said wipers when raised, to be projected over the edge of the sole.

A rod 52 is attached at its upper end to the lower end of the bar 43 of the jack and at its opposite end to a double foot lever 53, the rod being pivoted to the foot lever at one side of the pivot of said lever so that the operator by placing his foot upon one end of said lever may draw the said bar downward against the action of its spring to release the last at any time during the lasting operation, and by placing his foot upon the opposite end of said lever the jack may be lifted to increase the clamping pressure.

In order that the leather of the shoe upper which is being lasted may be stretched tightly over the heel or toe of the last and at the same time held against any possibility of wrinkling during the lasting operation, a clamping foot 56 is provided to engage the inner curved side of the projecting edge of the upper at the heel or toe of the shoe and clamp said edge between it and the forming or wiping edges of the wipers. This foot is pivoted at its upper end to the forwardly projecting end of the push-bar 19 and at its lower end is provided with laterally extending curved portions 57 so formed on their outer side as to substantially conform to the outline of the heel or toe of the shoe and thus firmly hold said edge against the wipers without altering the curve which the leather naturally takes when tacked upon the last in the usual manner. Pivotally attached to one side of the post 21 is a guide block 58 having a transverse hole in which a rod 59 is adapted to slide freely. This rod is pivotally attached at one end to the foot 56 intermediate its ends, and sleeved thereon between said block and an adjusting nut 60 on its opposite end is a coiled spring 61 which normally acts to swing the foot down against the formed edge of the wipers and clamp the edge of the leather between. By adjusting the nut 60 the tension of the spring is increased or diminished to increase or diminish the clamping power of the foot. A latch-bar 62 is pivoted intermediate its ends upon the top of the rearmost bearing 27, the forward bearing serving as a stop to limit the falling of the forward end of said latch-bar which is normally held against the stop by a coiled spring 63, and said forward end is adapted to engage the rear end of the rod 59 upon the rearward and downward movement of the forward end of the push-bar to which the clamping foot 56 is attached and cause said rod to slide through its bearing block against the action of said spring, turning the foot on its pivot and swinging it upwardly and forwardly away from the wipers, as shown in Figs. 1 and 11. Upon the large gear wheel 7 on the counter-shaft 5, is a pin 64 projecting from the side thereof, shown in Fig. 3, and this pin is so set that at the proper moment it will engage the rear end of the latch bar and, tilting the same, raise its forward end out of engagement with the rod 59, releasing said rod and permitting the spring to act to throw the foot into clamping position. In certain kinds of work, the edge of the upper is held in place at the center of the toe by a tack, as shown in Fig. 13, and as it is not desirable to remove this fastening, the foot 56 may be cut away or provided with a notch 65 at its center if so desired, to permit of thus fastening the upper at the toe of the last.

To hold the edge of the sole over which the upper is being lasted, firmly down upon the last so that it will not be displaced by the wipers when they are forced over and upon said edge, a toe plate 66 is slidably attached to the pressure arm 41 by a screw 67 extending through a longitudinal slot in said plate, and the lower end of this plate is broadened out and curved in such a manner that its edge is adapted to engage the sole close to the edge thereof around the toe, and, being attached to the presser-arm, presses firmly down upon said edge. The plate is projected downwardly to engage the sole, by a coiled spring 68 sleeved on the presser-arm between the presser-bar and the forward end of said plate which is turned upwardly to form a lug 69 adapted to be engaged by the laterally bent end of a stop-arm 70 carried by the post 21, when said post is moved forward by the push-bar to carry the wipers over and down upon the edge of the shoe sole. Said toe plate is thus moved on the arm against the action of the spring 68 out of the way of the wipers as they move forward. A notch 71 may be provided in the toe plate, as shown in Fig. 13, to permit the upper to be tacked to the insole at the center of the toe, if so desired.

To effectually secure the edge of the upper in place after the lasting operation is completed, a wire is stretched tightly around the toe in contact with the lasted edge, its ends being made fast to tacks driven into the sole, and to automatically so place the wire and draw it tight, said wire, which is supplied from any suitable spool indicated at 72 in Figs. 8 and 9, is passed through any suitable tensioning device 73, then through the loop formed by the curved guide finger 74 and its end fastened to a tack driven into the sole near the left hand edge thereof. A supporting arm 75 is rigidly secured at one end to the lower end of the post 21 below the wiper levers, and to the free end of this rigid arm is pivoted a curved arm 76 having a grooved roll 77 at its free end which engages the wire midway between its secured end and the tension device. To the curved arm is pivotally attached at one end, an operating rod 78, and the opposite end of said rod is attached to the lower end of a lever 79 which is pivoted at its upper end to the stationary bracket 34 and connected intermediate its ends to the push-bar 19, so that upon the forward movement of said push-bar the lever 79 is swung on its pivot and turns the curved arm 76, carrying its roll upward and over the last forward of the presser bar to stretch the wire around the toe, the wire being guided to place close up beneath the wipers at their forward edges by the guide finger 74 which is rigidly secured to the supporting arm and curved downward therefrom thence upward to form a loop, with its free end close beneath the wipers and adjacent to their formed or wiping edge. Any desired number of these guide fingers may be used or the form may be changed as desired.

In Figs. 1, 8 and 11, the parts are shown in position to receive the shoe to be lasted and Figs. 5, 6 and 7 are diagrammatic illustrations of the actuating cams showing their relation to each other and to the other parts when said parts are in the position shown in the first named figures or when the rolls engaging said cams are in position *a* as illustrated in said Figs. 5, 6 and 7. When the parts are in the position shown in said Figs. 1, 8 and 11, they are at rest with the jack 42 down, the roll 46 being in contact with the small part of the jack-cam; the wipers in their lowest position, the roll 17 on the rocker-arm being in contact with the concentric inner part of its cam groove; and the push-bar carrying said wipers, in its rearmost position, the roll 20 being in the innermost portion of its cam groove. As illustrated in Fig. 11, the operator places the last with the shoe sole firmly up against the presser-bar and presser-arm, and the toe plate engaging said sole close to its edge with the projecting edge of the upper extending up adjacent to the wiping edge of the wipers. As shown in dotted lines in Fig. 1, the pin 64 is just in contact with the rear end of the latch-bar 62 and when the operator starts the machine by actuating the dog 12 to release the member 10 and permit the clutch to operate to turn the driving shaft, the first movement will rock said latch-bar and release the clamping foot 56 to clamp the edge of the upper to the edge of the wipers. At the same time the jack is raised by the turning of the jack-cam and the last is firmly clamped between the jack and the presser-bar and presser-arm. When the driving shaft has made one revolution, it is again stopped by the dog 12, the cams having been turned one-third of a revolution or to position *b* which turning has raised the wipers slightly and projected them forward a short distance, the cam grooves in the rocker and push cams being slightly farther from the center of the cam at this point. While the machine is at rest in position *b* the operator threads the securing wire over the grooved pulley on the curved arm 76 and through the loop of the guide finger 74 and secures its end to a tack in the shoe sole. The wire may however be secured to the tack before the last is placed in the machine. The machine is then again started by releasing the dog 12 and during this revolution of the power shaft and the turning of the cams from position *b* to *c* the jack is firmly held up to place by the large concentric side of the jack-cam; the push-bar is projected to the forward limit of its stroke carrying the wipers forward and at the same time closing them, carrying the rear end of the actuating rod for the clamping foot past the forward end of the latch-bar, engaging the stop arm 70 with the lug on the toe-plate and moving said plate out of the path of the wipers, and turning the curved arm on its pivot to stretch the wire around the toe and carry it forward over the last; and the rocker-bar is rocked to the upper limit of its stroke and then to its lower limit, raising the wipers to stretch the upper up around the toe and then pressing its edge down hard upon the sole as said edge is carried over and upon said sole.

In Figs. 2, 3, 4, 9, 10 and 12 the parts are shown in position at the end of the lasting operation or position *c*. While the parts are at rest in position *c*, the operator severs the securing wire and makes it fast to a tack driven into the sole near the right side thereof, and upon again starting the machine by releasing the dog 12, the jack at once falls, releasing the shoe; the push-bar is retracted causing the latch-bar to raise the clamping foot, moving the wipers to their rearmost position, moving the stop-arm out of engagement with the toe-plate, and swinging the wire-arm backward; and the rocker-bar is held in its lowered position. The cycle of operation is thus completed and the parts are again in position to receive another last. The stopping mechanism permits the mechanism to stop automatically at each critical point.

It is obvious that if the operator holds the dog 12 out of engagement, the operation of the machine will be continuous and when he has become very proficient in the manipulation of the machine it will be necessary for him to stop the machine only to remove the lasted shoe and put another last in position.

Having described my invention, what I claim as new and desire to secure by Letters Patent of the United States is, 1. In a lasting machine, the combination with wipers and means for actuating the same, of means for drawing a securing wire around the toe of the shoe being lasted, and means for actuating said means in time relation to the movement of the wipers, substantially as described.

2. In a lasting machine, the combination with wipers and means for actuating the same, of a pivoted arm adapted to be turned to draw a securing wire around the toe of the shoe being lasted, and means for turning said arm, substantially as described.

3. In a lasting machine, the combination with wipers and means for actuating the same, of an arm adapted to engage a wire at one end and pivoted to swing said wire engaging end upward, around and over the toe of the shoe being lasted, substantially as described.

4. In a lasting machine, the combination with wipers and means for actuating the same and means for supporting in desired relation to said wipers a last adapted to have secured thereon a boot or shoe to be lasted, of a guide secured at one end and extending upwardly and forwardly with its free end adjacent to the lower surface of the wipers to direct a securing wire to be drawn around the toe of the shoe being lasted, up over the edge of the sole in contact with the outer surface of the lasted edge of the upper, substantially as described.

5. In a lasting machine, the combination with wipers and means for actuating the same and with means for supporting in proper relation to said wipers a last adapted to have secured thereon a boot or shoe to be lasted, of a guide supported below and adjacent to the lower surface of the wipers to direct to place independently of the wipers a securing wire to be drawn around the toe of the shoe to hold the upper in place, substantially as described.

6. In a lasting machine, the combination with wipers and means for actuating the same, of an arm pivoted at one end, a wire engaging roll on the opposite end of said arm, said arm being so shaped and pivoted that when turned on its pivot, its end carrying the roll will be moved from a plane below that of the shoe sole to a plane above the said sole and at a point midway between the toe and heel, and means for turning said arm in timed relation to the movement of the wipers, substantially as described.

7. In a lasting machine, the combination with means for supporting a last and shoe upper in position to be lasted, of means for laying-over the edge of the upper about the toe of the last, separate means to place a securing wire about the lasted toe after the toe has been lasted, power operated means for automatically operating said laying-over means, and automatic operating mechanism for actuating the wire-placing means to tighten the wire around the toe from start to end after the entire toe has been lasted, substantially as described.

8. In a lasting machine, the combination with means for supporting a last and shoe upper in position to be lasted, of lasting devices for wiping inwardly the edge of the upper about the toe of the last, separate, dissimultaneously operating means to thereafter place a securing wire about the previously lasted toe, power operating means for automatically operating said lasting devices, including automatic stopping means to halt the machine after the lasting and before the final operation which completes the wiring of the shoe, and means permitting the operator thereupon to lower slightly the last and upper, substantially as described.

9. In a lasting machine, means for holding and clamping a last and upper in position to be lasted, means for lasting the upper, means for wiring the toe, and power operating mechanism for the aforesaid parts, including means for automatically stopping the machine between the clamping operation and lasting operation, and means for automatically stopping the machine between the lasting operation and the releasing of the lasted shoe, substantially as described.

10. In a lasting machine, means for holding and clamping a last and upper in position to be lasted, means for lasting the upper, means for wiring the toe, and power operating mechanism for the aforesaid parts, including means for automatically stopping the machine between the lasting operation and the return of the wiring means from its toe-wiring position, substantially as described.

11. In a lasting machine, means for holding and clamping a last and upper in position to be lasted, means for lasting the upper, means for wiring the toe, power operating mechanism for the aforesaid parts, and means within the control of the operator enabling the operator to stop the machine at will after the last and upper have been clamped, substantially as described.

12. In a lasting machine, means for holding and clamping a last and upper in position to be lasted, means for lasting the upper, means for wiring the toe, power operating mechanism for the aforesaid parts, and means within the control of the operator enabling the operator to stop the machine at will after the last and upper have been clamped, and after the upper has been lasted, substantially as described.

13. In a lasting machine, means for holding and clamping a last and upper in position to be lasted, means for lasting the upper, means for applying a binder around the toe, and power operating mechanism for the aforesaid parts, including means for automatically stopping the machine between the clamping operation and lasting operation to enable the operator to see if the last and upper are in proper position, and means for automatically stopping the machine, after the binding operation, to permit the lasted upper to be removed and another last and upper to be put in place, substantially as described.

14. In a machine of the class described, the combination with means for working an upper over the toe portion of a last, of separate means operated automatically for drawing a binder into position to hold the upper, said overworking means comprising wipers adapted to hold the binder down upon the upper while the binder is being drawn into holding position, substantially as described.

In testimony whereof, I have signed my name to this specification, in the presence of two subscribing witnesses.

CHARLES F. PYM.

Witnesses:
  OTTO F. BARTHEL,
  C. R. STICKNEY.

---

Copies of this patent may be obtained for five cents each, by addressing the "Commissioner of Patents, Washington, D. C."